United States Patent [19]

Hall et al.

[11] 4,164,865

[45] Aug. 21, 1979

[54] ACOUSTICAL WAVE FLOWMETER

[75] Inventors: Lawrence G. Hall; Robert S. Loveland, both of West Covina, Calif.

[73] Assignee: The Perkin-Elmer Corporation, Norwalk, Conn.

[21] Appl. No.: 927,270

[22] Filed: Jul. 24, 1978

Related U.S. Application Data

[63] Continuation of Ser. No. 770,677, Feb. 22, 1977, abandoned.

[51] Int. Cl.$^2$ .................................................... G01F 1/66
[52] U.S. Cl. ................................................... 73/194 A
[58] Field of Search ..................................... 73/194 A

[56] References Cited

U.S. PATENT DOCUMENTS

| Re. 29,383 | 9/1977 | Gallatin et al. | 137/14 |
|---|---|---|---|
| 2,724,269 | 11/1955 | Kalmus | 73/194 A |
| 2,921,467 | 1/1960 | Hedrich et al. | 73/194 A |
| 3,109,112 | 10/1963 | Lester | 73/194 X |
| 3,466,652 | 9/1969 | Heyser | 343/14 |
| 3,965,341 | 6/1976 | Honey et al. | 235/151.34 |
| 4,003,252 | 1/1977 | Dewath | 73/194 A |
| 4,011,755 | 3/1977 | Pedersen et al. | 73/194 A |
| 4,078,428 | 3/1978 | Baker et al. | 73/194 A |
| 4,080,837 | 3/1978 | Alexander et al. | 73/61.1 R |

Primary Examiner—Charles A. Ruehl
Attorney, Agent, or Firm—Salvatore A. Giarratana; Francis L. Masselle; Edwin T. Grimes

[57] ABSTRACT

A flowmeter for accurately determining the rate of flow of a gas substantially independent of its molecular composition and also for determining a measure of the velocity of sound in that gas. The gas flows through a transducer assembly. Disposed in the transducer are two cylindrical transducers each capable of producing or responding to acoustic compressions in the gas. The transducers are alternately switched between transmitting and receiving with one transducer at a given instant being used to transmit and the other to receive. The phase difference between the transmitted and the received signal for two successive transmit-receive cycles are stored with the difference between two successive stored phase differences indicating the magnitude and the direction of fluid flow and the sum of the stored phase differences providing a measurement of the velocity sound in that gas. The flowmeter includes circuitry for automatically compensating for changes in gas composition so that the indicated flow rate is correct at all times.

30 Claims, 7 Drawing Figures

ACOUSTICAL WAVE FLOWMETER

This is a continuation of application Ser. No. 770,677, filed Feb. 22, 1977, now abandoned.

BACKGROUND OF THE INVENTION

The invention relates broadly to the field of flowmeters and particularly to acoustical flowmeters for measuring the rate of flow of a fluid along a confined path.

A typical acoustical wave flowmeter is disclosed in U.S. Pat. No. 3,109,112. This flowmeter has a pair of transducers for generating and receiving compressional waves in either the audible or ultrasonic frequency range. These transducers are located within an enclosure through which the fluid flows. The transducers are alternately configured in transmit and receive mode so that compressional waves are produced in the gas by the transmitting transducer and received at the other transducer. By measuring the phase difference between the transmitted and the received waves in both directions, the velocity of the gas passing through the transducer is determined.

A modification to the approach described in the above mentioned U.S. Patent relies on transducers designed with a transmit and a receive section configured to substantially eliminate any problems due to gas composition or temperature changes in the gas.

The above known configuration requires that the transducer be located in the flow path of the gas whose velocity is to be measured or located in a cavity in the conduit wall. In either arrangement, the normal flow of the fluid is substantially altered when passing the transducer thereby causing the accuracy of the meter to suffer. Additionally, sedimentery particles in the fluid or the like can collect around the transducers thereby impairing the transducer's transmitting and receiving characteristics.

A flowmeter has been developed in an effort to overcome these and other difficulties of known acoustical flowmeters. The improved flowmeter is designed to have no obstructions along the flow path and is described in U.S. patent application Ser. No. 599,245 filed on July 24, 1975, entitled "Acoustical Wave Flowmeter" and invented by Edward James DeWath, now U.S. Pat. No. 4,003,252. In that flowmeter, the transducers are generally cylindrical in shape and are disposed within the walls of the fluid conduit thereby eliminating all obstructions in the flow path as well as eliminating cavities in the conduit wall in which debris might collect.

While the invention of Edward James DeWath does eliminate obstructions in the path of fluid flow as well as cavities in the conduit wall, his flowmeter may become inaccurate or fail to function entirely whenever the composition of the gas flowing therethrough is different from that for which the meter is calibrated. Indeed, this is a common problem with most acoustical flowmeters as the velocity of acoustical compressions within a gas is a function of its chemical composition so that typical acoustical flowmeter accuracy depends on calibrating it for the specific gas whose flow is to be measured. Requiring recalibration each time the flowmeter is used with a different gas is, at best, an inconvenience. In applications where the gas composition changes as the flowmeter is used as, for example, in pulmonary function analyzers, known acoustic wave flowmeters are inaccurate unless corrective feedback is provided from a gas analyzer to compensate for gas composition change.

Accordingly, it is an object of the present invention to provide a flowmeter which is accurate regardless of changes in gas composition or temperature during use.

It is yet another object of the invention to provide a flowmeter including means to automatically adjust the flowmeter operation as a function of dynamic gas compositional and temperature changes and to provide a measure of the velocity of sound, which is itself related to the average molecular weight of the gas.

SUMMARY OF THE INVENTION

The invention comprises an acoustical wave flowmeter having, in its preferred form, two transducers mounted in the wall of a conduit so that there is no obstruction to gas flow and no cavities in the wall to provide a locus for collecting particulate matter. The transducers are connected to an electronic circuit which alternately switches one of them into transmit mode and the other into receive mode. Automatic circuit adjustment means is provided to adjust the transmitting frequency so that the energy in the acoustic compressions generated by a transmitting transducer is maximized at a receiving transducer thereby compensating for the change in velocity of acoustic compressions in the gas caused by changes in gas composition or temperature.

The electronic circuit includes circuitry to measure and store the phase difference between the signal producing acoustic compressions at a transmitting transducer and the signal produced by the receiving transducer in response to the acoustic compressions during each of two successive transmit-receive cycles. Circuit means is provided to determine the difference between two successive phase differences, at least one of which was previously stored, wherein the sign of the difference corresponds to the direction of gas flow and the magnitude of the difference corresponds to the rate of gas flow through the flowmeter. Circuitry is also provided to form the sum of two successive phase differences which is proportional to the velocity of sound in the gas moving through the flowmeter.

BRIEF DESCRIPTION OF THE DRAWINGS

The invention is described below in greater detail in conjunction with the drawings wherein.

DETAILED DESCRIPTION

Figure 1:
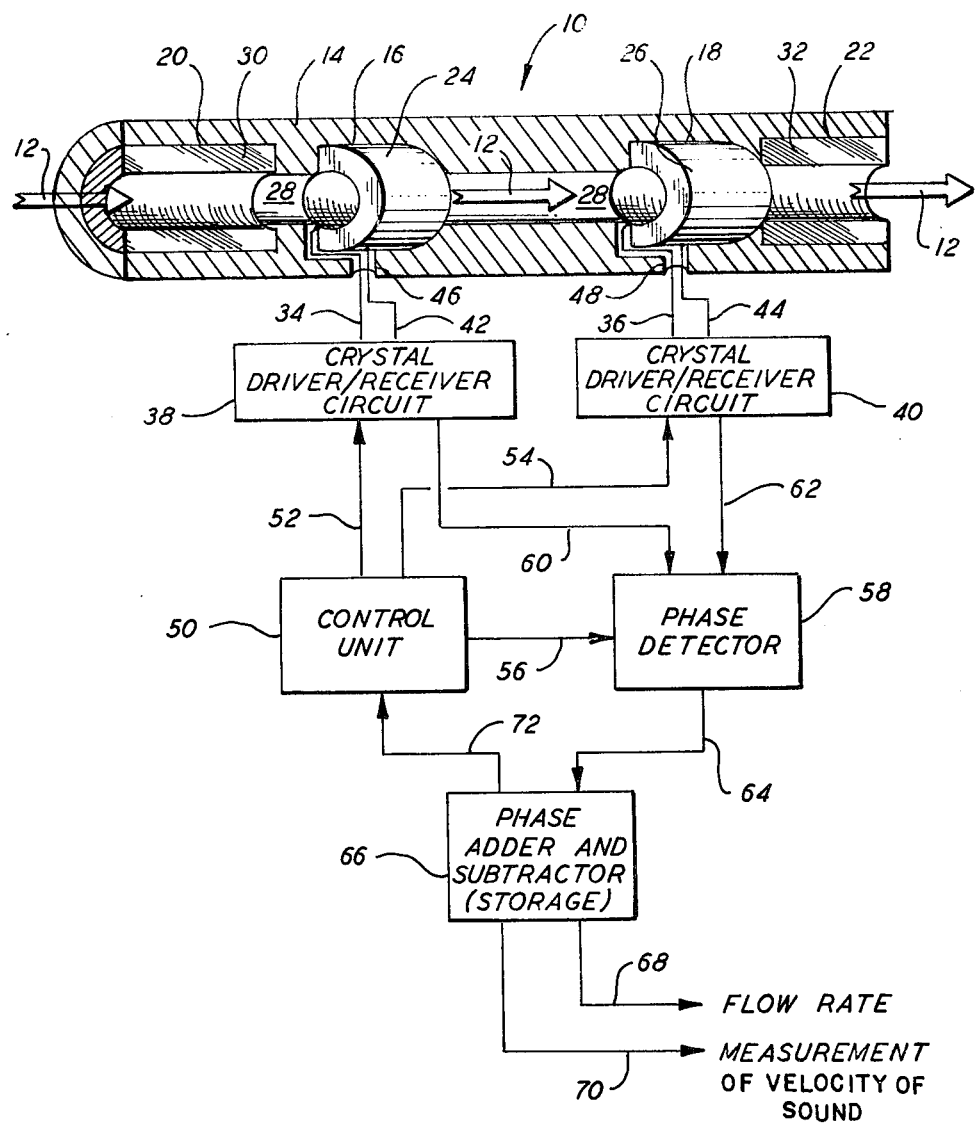
FIG. 1 is a schematic diagram of the flowmeter including the transducer assembly and a block diagram of the electronic circuitry associated therewith.

Referring first to FIG. 1, the flowmeter of the present invention includes a transducer assembly 10, shown in longitudinal section, which comprises a substantially cylindrical body having a central opening extending through the assembly 10 through which gas flows in a direction as indicated by the arrows 12. These arrows 12 indicate gas flow through the transducer assembly 10 in a direction from left to right as viewed in FIG. 1. Gas can flow through the assembly 10, however, in the opposite direction if so desired.

The transducer assembly 10 is generally made in accordance with the description found in U.S. Pat. No. 4,003,252 by Edward James DeWath and entitled "Acoustical Wave Flowmeter", the specification and drawings being incorporated herein by reference. Accordingly, the transducer assembly 10 of the present invention may additionally include a cylindrical casing made of metal or other suitable material (not shown in FIG. 1) which surrounds the support member 14. The support member 14 itself is preferably fabricated from a polyurethane foam, foam rubber or other material having good acoustical damping properties. Two annular notches 16 and 18 are formed into the inner wall of the support member 14 and are disposed in spaced relation to each other along the path of fluid flow as indicated by the arrows 12. Two additional annular notches 20 and 22 are disposed at opposite ends of the support member 14.

Disposed respectively within and in contact with the surfaces defining each annular notch 16 and 18 is a cylindrical transducer 24 and 26 each having an inner cylindrical bore passing therethrough which is substantially coextensive with the inner cylindrical bores 28 which extend between the annular notches of the support member 14.

Transducers with other geometry such as arcuate transducers may also be used with appropriate changes to the remaining parts of the transducer assembly 10 so as to maintain a centrally located bore therethrough with no obstructions and no cavities in the bore wall to provide a locus for particulate matter to collect.

Disposed respectively within each annular notch 20 and 22 is a terminal ring 30 and 32 which is preferably made of sound absorbing material such as a polyurethane damping foam like Y-370 Vibration Damping Tape manufactured by the 3M Corp. Materials having similar sound absorbing properties may also be used for the terminal rings 30 and 32. The terminal rings 30 and 32 each have an inner cylindrical bore which is substantially coextensive with the adjacent cylindrical bores 28 of the support member 14. Accordingly, the fluid flow path through the transducer assembly 10, as indicated by the arrows 12, has a substantially continuous wall so that the fluid flowing therethrough encounters neither protuberances nor caviites.

The transducers 24 and 26 may comprise one of a number of conventional devices capable of operating in radial or hoop mode for generating acoustical compressions within the gas passing through the assembly 10. Examples of suitable materials for the transducers 24 and 26 include cylindrical bodies made for polyvinylflouridene or other high polymer organic piezoelectric materials, ceramic tranducers fabricated from barium titanate, lead zirconate titanate, or other polarized polycrystalene ferroelectric ceramic materials, quartz, tourmaline, or equivalent electromechanical devices known to those skilled in the art.

The inner and outer surfaces of the transducer 24 and 26 have conductive coatings thereon which constitute the electrical drive electrodes. The conductive coatings on the inner surfaces of the transducers 24 and 26 are respectively connected via wires 34 and 36 to externally located crystal driver/receiver circuits 38 and 40. The conductive coating on the outer surface of the transducers 24 and 26 are respectively connected via wires 42 and 44 to the crystal driver/receiver circuits 38 and 40. The electrical connection wire pairs 34, 42 and 36, 44 for the transducers 24 and 26 respectively pass through openings 46 and 48 which respectively communicate from outside the assembly 10 to the transducers within annular notches 16 and 18.

The operation of the transducer assembly 10 in cooperation with the electronic circuitry is fundamentally the same as described in the above-referenced Patent of Edward James DeWath and the contents of that application are herein incorporated by reference. Basically, however, the transducer assembly is connected by flexible hoses, tubing, or the like to an external source of fluid whose flow rate is to be determined. The fluid itself may comprise either a gas or a liquid although the illustrated embodiment of the invention is designed particularly for measuring gas flow as it flows through the transducer assembly 10 in an axial direction indicated by the arrows 12 or in the opposite direction. A control circuit 50 is coupled respectively by lines 52 and 54 to the transducer driver/receiver circuits 38 and 40. The control circuit 50 is operative to cause one of the transducer driver/receiver circuits 38 or 40 to transmit an electrical signal to the respectively coupled cylindrical transducer 24 or 26 while the other driver/receiver circuit 40 or 38 is conditioned to receive a signal from the coupled transducer 26 or 24. As indicated earlier, the transducer 24 or 26 which receives electrical signals from one driver/receiver circuit responds thereto by producing an acoustic compression in the fluid. At the same time, the other transducer coupled to the other driver/receiver circuit 38 or 40 responds to the acoustic compressions in the fluid by producing an electrical received signal which is sensed by the coupled driver/receiver circuit.

The acoustic compressions produced at one of the transducers 24 or 26 take a finite time to propagate from the transmitting transducer to the receiving transducer with the propagation time being dependent on the direction and the velocity of fluid flow through the transducer 10 and the velocity of sound in the fluid flowing within the transducer 10. These relationships are described in greater detail in the above mentioned Patent.

Figure 1A:
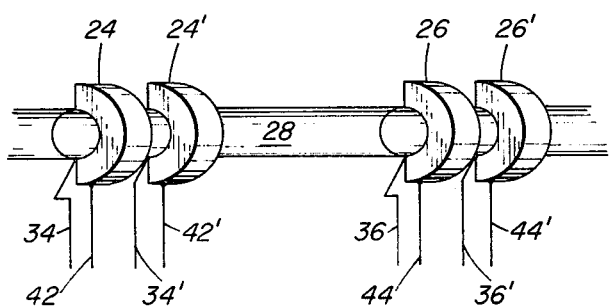
FIG. 1a is a fragmentary schematic diagram showing an alternative form of transducer.

As an alternative to the above described transducers, FIG. 1a, each transducer 24 and 26 can be replaced by a pair of transducers 24, 24' and 26, 26' mounted in the assembly 10 in a similar manner. Transducer 24 and 24' are connected to circuit 38 by wire pairs 34, 42 and 34', 42'. Transducers 26 and 26' are connected to circuit 40 by wire pairs 36, 44 and 36', 44'. Of the pair of transducers, one is specifically for transmitting, i.e., producing acoustic compressions, and the other is a receiving transducer, i.e., to produce a received signal in response to acoustic compressions in the gas.

The transducer assembly 10 and the coupled circuitry, operate in the following manner. The control circuit 50 first causes one transducer, either transducer 24 or 26, to produce acoustic compressions in the fluid and at the same time the other transducer, either 26 or 24, is conditioned to receive the acoustic compression from the first transducer. This mode of operation comprises a first transmit-receive cycle. A transmit signal is simultaneously sent from the control circuit 50 over either line 52 or 54 to one driver/receiver circuit 38 or 40 and over the line 56 to a phase detector 58. A received signal from the receiving transducer 24 or 26 is coupled by either transducer driver/receiver circuit 38 or 40 over lines 60 or 62 respectively to the phase detector 58. The phase detector 58 responds to the transmit signal and to the received signal by producing a signal on line 64 which indicates the phase difference between the transmitted and the received signal. This information is coupled over line 64 to a phase adder and subtractor 66 which includes storage means for storing temporarily the phase difference received from the phase detector 58.

The control circuit 50 then causes the transducers 24 and 26 to change roles. That is, the other transducer 24 or 26 is placed in transmit mode to produce acoustic compressions in the fluid and the first transducer 24 or 26 is placed in receive mode. This mode of operation comprises a second transmit-receive cycle. The phase detector 58 is operative during the second transmit-receive cycle to determine the phase difference between the transmitted signal and the received signal and this second phase difference is transmitted over the line 64 to the phase adder and subtractor 66 which also temporarily stores this second phase difference.

Figure 6:
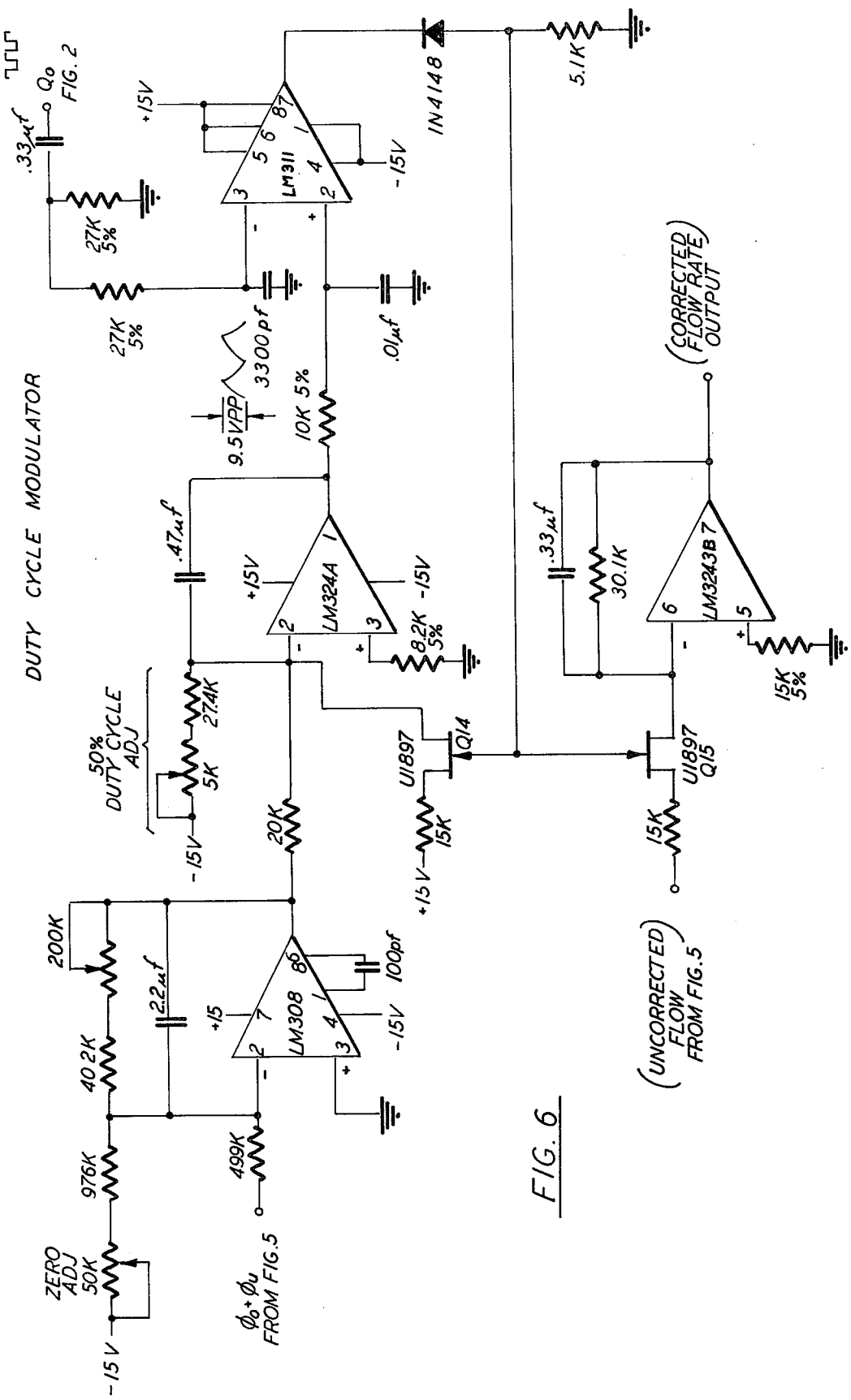

The phase adder and substractor 66, once the two phase differences have been stored therein, calculates both a sum and a difference between the two stored phase differences. The difference between the two stored phase differences with one further correction described in connection with FIG. 6 is presented on the output line 68 which, when the flowmeter of the invention is calibrated, is indicative of the flow rate through the transducer assembly 10. In addition, the algebraic sign of the difference between the two phase differences calculated by the phase detector 58 is indicative of the direction of flow through the transducer assembly 10 with a positive algebraic sign representing one arbitrary direction of fluid flow through the assembly 10 and a negative algebraic sign representing the opposite direction of fluid flow.

The sum of the two phase differences as calculated by the phase adder and subtractor 66 is presented on the output line 70. The magnitude of the signal on the line 70 is proportional to the velocity of sound in the gas passing through the assembly 10 compared to the velocity of sound in the reference gas used for calibration. The sum is also transmitted over the line 72 to the control circuit 50 which is utilized thereby in a manner described in greater detail below. In addition, it is used to correct the flow value on line 68. The value presented on the output line 70 is a relative one and the flowmeter, according to the invention, must be calibrated so that the magnitude of the value on line 70 can be interpreted.

As indicated generally above, a failing of the flowmeter described in the above mentioned Patent by DeWath is that the meter there described is not operational in environments where the velocity of sound in the gas passing through the transducer changes dynamically during its use. We have found that the cylindrical transducer system functions by building up a strong resonant echo across the diameter of the tube at one or more Eigen (characteristic) frequencies. For example, the relationship may be approximately $2.3\lambda = D$, where $\lambda$ is the wavelength of sound in the fluid (cm.) and D is the inside diameter of the crystal and tube (cm.). The reason for the above described flowmeter failure then is due to the fact that the velocity of the acoustic compressions within the gas passing through the flow detecting transducers varies as a function of the gas composition. This causes the amplitude of the acoustic compressions, detected by the transducer in the assembly which is in receive mode to vary because the inner diameter of the transducers is no longer equal to the Eigen wave length thereby causing the magnitude of the signal produced by the receiving transducer to fall off dramatically. Accordingly, the received signal becomes more difficult to detect thereby introducing the possibility of detection error or complete failure to detect the acoustic compression. This failure can be overcome by changing the inner diameter dimension of the transducers within the assembly or by changing the frequency of the acoustic compressions produced by the transmitting transducer. As the transducer assembly itself is not suitable for inner diameter adjustment of the transducers, clearly, the better approach to solving this problem is to adjust the frequency of the acoustic compressions produced by the transmitting transducer. Accordingly, the sum of the phase differences as calculated by the phase adder and subtractor 66 is transmitted over the line 72 to the control circuit 50. As indicated above, the signal on the line 72 is related to the velocity of sound in the gas passing through the assembly 10. This signal is utilized by the control circuit 50 to change the frequency of the acoustic compressions produced by the transmitting transducer during each transmit-receive cycle so as to maintain the wavelength constant and thereby to maximize the signal received by the receiving transducer.

We have also found, after correcting the frequency in order to hold the wavelength constant, that we must multiply the apparent flow rate by the velocity of sound in order to produce an accurate flow rate measurement independent of change of gas composition.

Experience has shown that flowmeters of the type described in the above identified Patent are sometimes subject to error due to reflection of acoustic compressions from other parts of the system into which the transducer is connected. These reflections frequently result from the acoustic compressions bouncing off other fluid transmitting fittings which are coupled to the transducer assembly. Problems have also resulted when the transducer itself is used in breath analyzers where it is physically located in close proximity to the mouth of the individual whose breath is being analyzed.

The present invention overcomes the reflection problem by providing the terminal rings 30 and 32 which are disposed at opposite ends of the assembly 10. These rings 30 and 32 are made of an acoustic damping material such as that mentioned earlier which is operative to substantially reduce the amplitude of acoustic compressions passing therethrough. Indeed, the magnitude of the damping provided thereby, if the proper material is selected for the rings 30 and 32, is sufficient so that one end of the assembly 10 may be inserted in close proximity to an individuals mouth whose breath is being analyzed and the problems experienced with other sonic flowmeters due to acoustic reflections is substantially eliminated. The damping provided by the rings 30 and 32 also substantially eliminates problems with reflections when the assembly 10 is coupled into the fluid carrying systems as well.

The foregoing discussion in connection with FIG. 1 has generally described the circuitry and operation of the invention. The circuitry of FIGS. 2, 4–6 comprise one actual implementation of the invention for use in pulmonary testing equipment, however, those of skill in the art will recognize that alternate circuits may be used, and the components may have to be changed to optimize the circuit for use in other applications for the invention.

Figure 2:
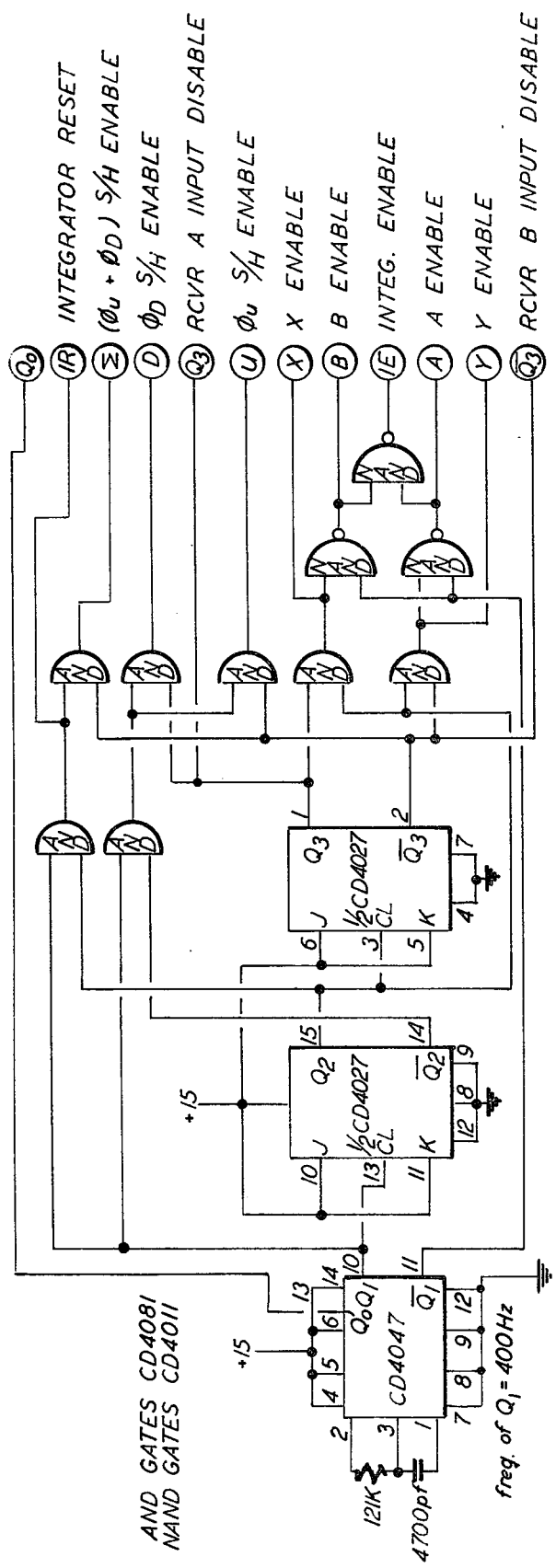
FIG. 2 is a detailed circuit diagram of a timing pulse generator for controlling the operation of the circuit of FIGS. 4 and 5.
Figure 3:
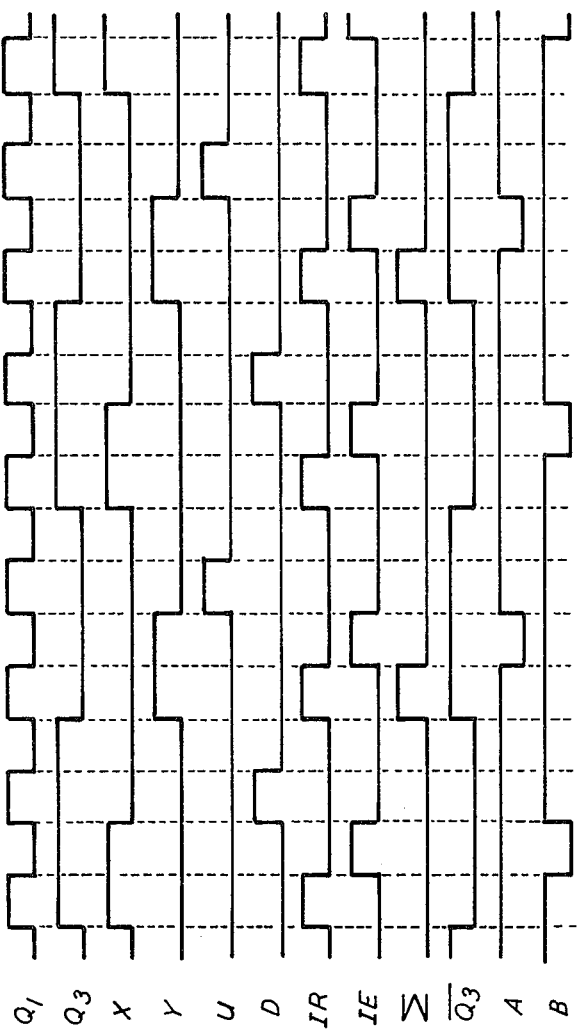
FIG. 3 is a timing pulse chart for the circuit of FIG. 2.
Figure 4:
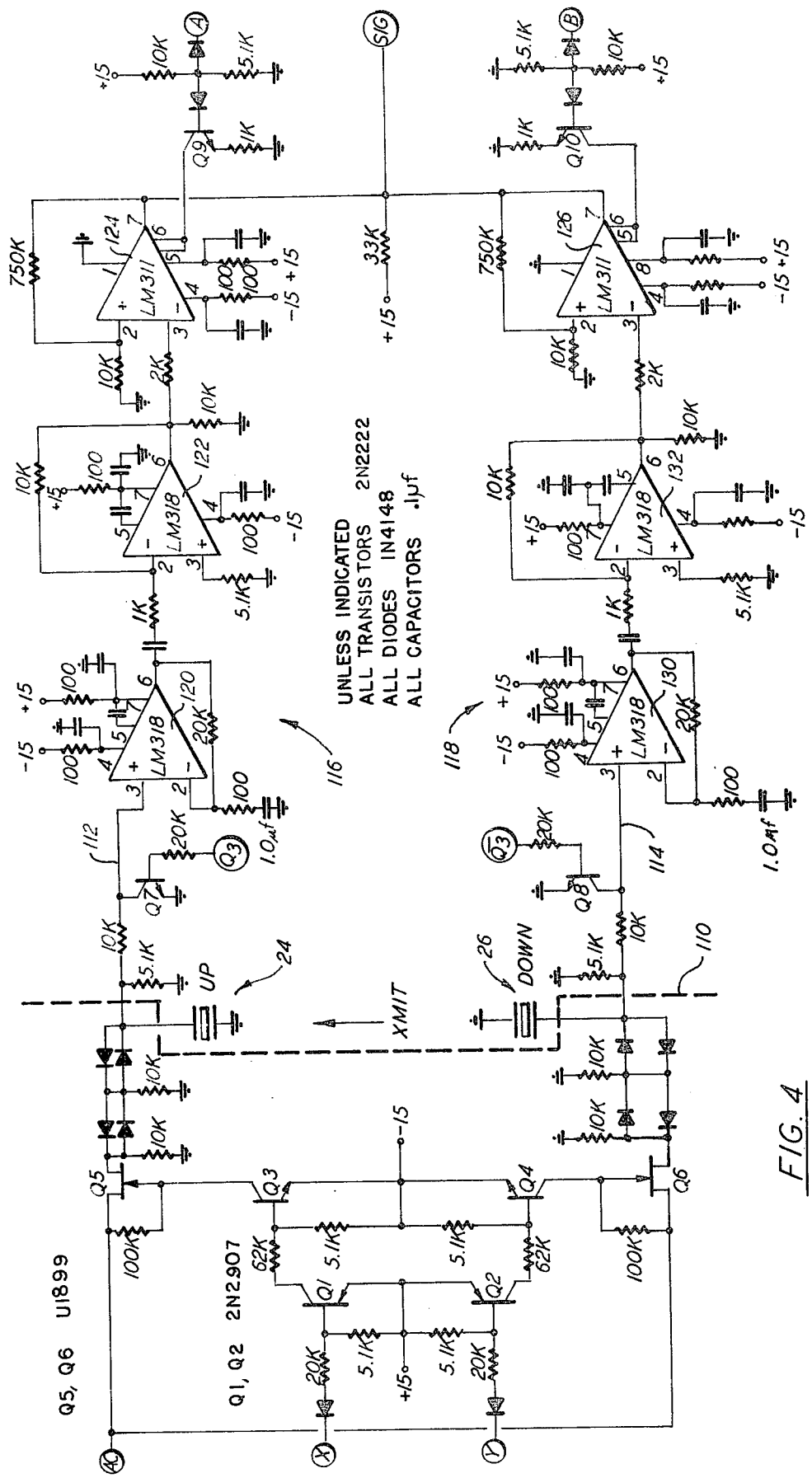
FIGS. 4–6 comprise a detailed circuit diagram for one embodiment of the flowmeter circuitry according to the invention which utilizes the timing pulses generated by the circuitry of FIG. 2.
Figure 5:
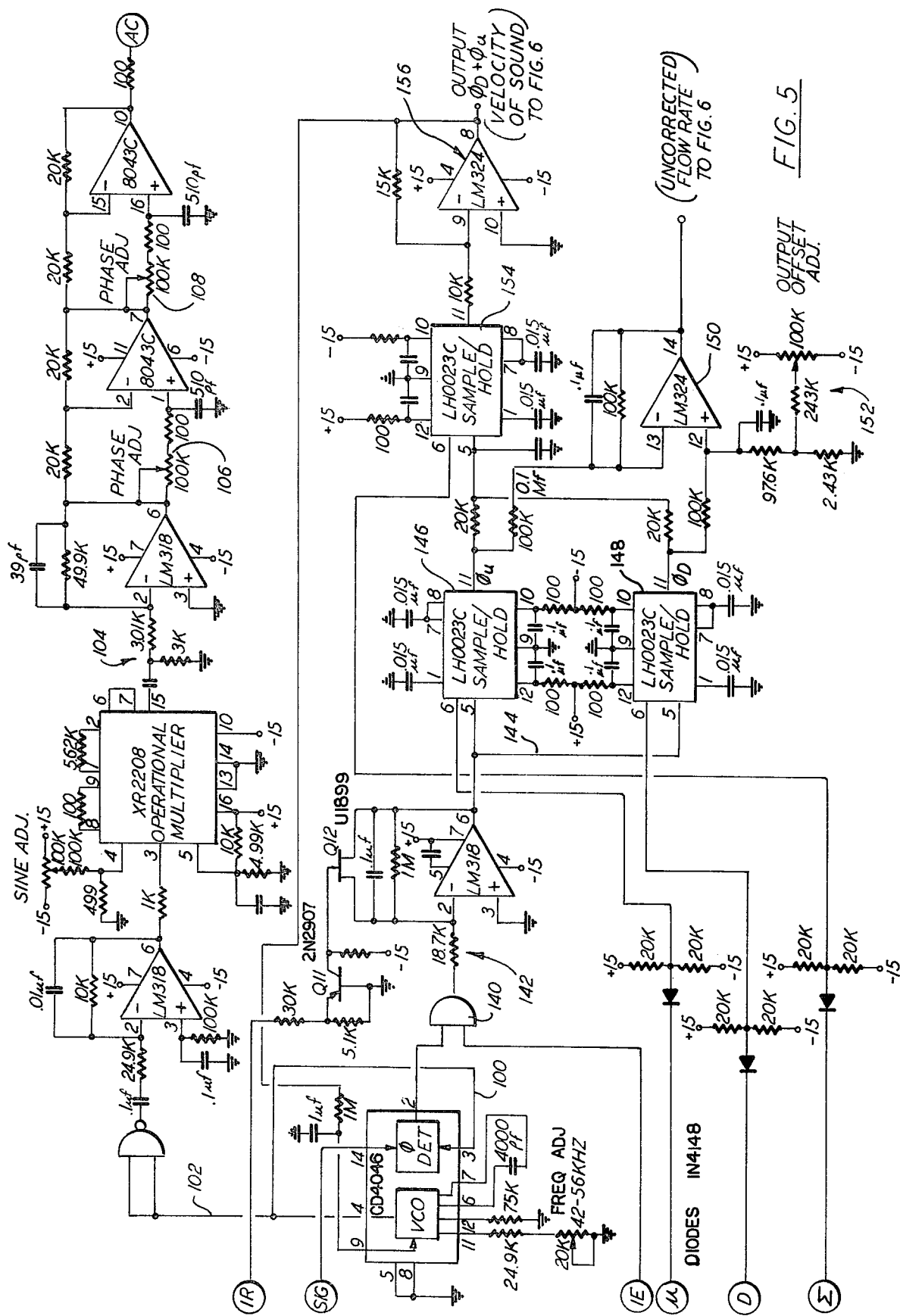

The circuitry of FIG. 2 comprises a pulse generator for producing control pulses to operate the circuits shown in FIGS. 4–6. FIG. 3, on the other hand, is a pulse diagram showing the pulse train for different outputs from the circuit of FIG. 2. Briefly, the circuit of FIG. 2 comprises an oscillator circuit, integrated circuit type CD4047, to which is coupled a 121K resistor and a 4700 PF capacitor for controlling the output frequency which, for the resistor and capacitor mentioned, is 400 Hz. Two series coupled J-K flip-flops, each comprising one half of a CD4027 integrated circuit, are utilized to produce timing pulses at a rate slower than that produced by the oscillator integrated circuit CD4047. The signals produced by the oscillator and the flip-flops are combined by the AND and NAND gates of FIG. 2 so as to produce the respective pulse strings as shown in FIG. 3. A pulse diagram for the output $Q_0$ is not shown in FIG. 3, however, it comprises a square wave having a frequency twice that for $Q_1$ and one leading positive going edge of a pulse on the line labeled $Q_0$ occures at the same time as the leading positive going edge of a pulse on the output of CD4047 labeled $Q_1$.

Referring now to FIG. 5, integrated circuit CD4046 has a voltage controlled oscillator (VCO) which produces a square wave signal at the output pin 4 whose frequency is controlled by the resistors connected in series between pin 11 and the ground as well as by the voltage applied at pin 9. For the particular resistors shown in FIG. 5 with a voltage at pin 9 of about +7.5 volts, the frequency of the square wave output from the votage controlled oscillator at pin 4 is nominally 51 KHz. Changing the voltage appearing at input pin 9 is operative to shift the frequency of the voltage controlled oscillator. The circuit of FIG. 5 will cause the frequency of the VCO to change dynamically to respond to changes in the velocity of sound in the gas in a manner described later in greater detail.

The square wave signal from the voltage controlled oscillator at pin 4 connects via a line 100 to pin 3 of circuit CD4046 which internally connects to a phase detector ($\phi$DET). The square wave signal also connects via a line 102 to a NAND gate whose output connects to an operational amplifier LM318 and operational multiplier XR2208. The function of these circuits is to produce a sine wave signal at point 104 having the same frequency as the square wave signal appearing at line 102. Those of skill in the art will recognize, however, that the circuitry between line 102 and point 104 comprises only one circuit of many known circuits for converting a square wave into a sine wave signal and that other equivalent circuits may be used.

Disposed between point 104 and the output terminal AC are three operational amplifiers comprising circuit types LM 318 and 8043C. The LM318 operational amplifier is for amplifying of the sine wave at point 104. The two 8043C operational amplifiers are for adjusting the phase of the signal appearing at the output terminal AC with adjustment resistors 106 and 108 being operative to adjust the phase of the signal at the output terminal AC by about 360°. These resistors are adjusted during calibration of the flowmeter and are preferably adjusted so that the signal at pin 9 of circuit CD4046 is +7.5 volts with no air flow through the transducer assembly 10 (FIG. 1). The description that follows will describe the mechanism by which phase adjustment of the signal at the output terminal AC causes the voltage at pin 9 to change.

The circuitry of FIG. 4 comprises the transducer driver/receiver circuits and shows how they are connected to the transducers 24 and 26. The circuitry of FIG. 4 is divided into a driver section appearing to the left of the dotted line 110 and a receiver section, excluding the transducers 24 and 26, appearing to the right of the dotted line 110.

The sine wave signal from the circuitry of FIG. 5 is connected to the input terminal AC in FIG. 4 and thereafter is coupled to two transducer driver circuits, the first driver circuit including Q5 and the second driver circuit including Q6. These transistors Q5 and Q6 gate the sine wave signal from the input terminal AC to the respectively coupled transducer 24 or 26 thereby placing the transducer into transmit mode. The gating signals are developed by the transistor pairs Q1, Q3 and Q2, Q4 and the respectively coupled circuitry which includes that circuitry of FIG. 2 for developing the gate signals which appear at terminals X and Y. As the gate signals at terminals X and Y occur at different times and alternate as shown in FIG. 3, the transducers 24 and 26 are alternately placed in transmit mode.

The receiver circuits 116 and 118 are also directly coupled respectively to the transducers 24 and 26, however, the receiver circuits 116 and 118 are either operative or inoperative to respond to signals developed by the coupled transducers 24 or 26 depending on whether the respectively coupled input shorting transistor Q7 or Q8 is either off or on. Transistor Q7, for example, is controlled by a gating pulse signal $Q_3$ and shorts line 112 to ground whenever the signal $Q_3$ is positive. In a similar manner, the transistor Q8 shorts line 114 to ground whenever the gate signal $\overline{Q_3}$ is positive. From the pulse chart of FIG. 3, it can be seen that $Q_3$ is positive whenever X is positive and hence receiver 116 is inoperative whenever the transducer 24 is in transmit mode and receiving signals from the input terminal AC. Similarly, receiver 118 is inoperative due to $\overline{Q_3}$ being positive whenever the transducer 26 is in transmit mode. As such, whenever a given transducer 24 or 26 is in transmit mode, the respectively coupled receiver circuit 116 or 118 is inoperative. However, whenever one transducer is in transmit mode, the receiver circuit 116 or 118 coupled to the other transducer 24 or 26 is enabled because the corresponding gating signal $Q_3$ or $\overline{Q_3}$ is at ground potential. For example, during a first transmit-receive cycle, the transducer 24 is in transmit mode and receives signals from the input terminal AC, the transistor Q7 is turned on by the signal $Q_3$ to turn receiver 116 off by grounding line 112 and the receiver circuit 118 is operatively coupled to transducer 26 because transistor Q8 is turned off due to gate signal $\overline{Q_3}$ being at ground potential. At the same time, the gate signal Y is at ground potential thereby preventing the signal appearing at the input terminal AC from being coupled via transistor Q6 to the transducer 26. The second transmit-receive cycle occurs when transducer 26 receives signals from the input terminal AC, transistor Q7 is turned off by $Q_3$, transistor Q8 is turned on by $\overline{Q_3}$, gate signal Y is positive and the gate signal X is at ground potential. As such, transducer 26 is in transmit mode, receiver 116 is operative and receiver 118 is inoperative.

The receiver circuit 116 coupled to the transducer 24 includes two operational amplifiers 120 and 122 connected in series and operative whenever transistor Q7 is not turned on to amplify any signal appearing at the input line 112. The amplified signal appears at pin 6 of operational amplifier 122 which is connected to the inverting input of a comparator circuit 124. The comparator circuit 124 is enabled whenever the gate signal A is at logic zero which allows the output signal to appear at pin 7.

The output at pin 7 is at a positive voltage (approximately +15 volts) when the sine wave input to pin 3 of the comparator 124 is of negative potential and at zero volts whenever the input at pin 3 is of positive potential. Comparator 124 thus converts the sine wave input into a square wave output. Comparator circuit 126 which couples thereto is inoperative during the period when comparator circuit 124 is operative and vice versa.

The receiver 118 includes two series connected operational amplifiers 130 and 132 which amplify the signal appearing on the input line 114 and present that amplified signal to the output pin 6 of the operational amplifier 132. This output signal at pin 6 of amplifier 132 is applied to the inverting input of a comparator circuit 126 which is enabled whenever the gate signal B is at logic zero. The output at pin 7 of the comparator circuit 126 is a square wave having a voltage of approximately plus 15 volts whenever the input at pin 3 is of negative potential and at approximately zero volts whenever the input at pin 3 is of positive potential. Since gate signal A and B occur at different times, the operation of the comparator circuit 124 or 126 does not affect the operation of the other comparator circuit 126 or 124.

Accordingly, the comparator circuits 124 and 126 are independently operative to produce square wave signals at their respective outputs from the sinusoidal signals which are developed across the coupled transducer 24 or 26 whenever that transducer is in receive mode and the required gating signals are present to actuate the receiver circuit 116 or 118. As the output pins of the comparator circuits are coupled together at terminal SIG, the signal appearing at terminal SIG represents the logical AND of the signals developed at the output of comparators 124 and 126.

The output from the receiver circuits 116 and 118 is transmitted via the terminal labeled SIG in FIG. 4 to the corresponding input terminal labeled SIG in FIG. 5 and then to pin 14 of the integrated circuit CD4046 which is internally connected to the phase detector circuit contained therein. The phase detector itself functionally operates the same as an EXCLUSIVE OR circuit whose output is internally connected in pin 2 of integrated circuit CD4046 and has a logic one output level whenever only one input to the phase detector is also at a logic one level. Accordingly, the signal appearing at pin 2 of integrated circuit CD4046 comprises a square wave signal which is pulse width modulated where the width of each pulse is related to the phase difference between the signal transmitted, i.e. the signal on line 100 and the received signal, i.e., the signal appearing at pin 14 of integrated circuit CD4046.

In normal operation of the flowmeter according to the invention, if the composition of the gas passing through the transducer assembly 10 (FIG. 1) changes from that when the meter was calibrated, the phase of the signal appearing at the input terminal SIG in FIG. 5 is different relative to the signal phase appearing at that input terminal when circuitry was calibrated. Accordingly, the phase detector output will be different thereby causing the voltage across the one microfared capacitor of the low pass filter comprising a 1 meg ohm resistor and a 1 microfared capacitor coupled to the output of operational amplifier 156 to change relative to that when the meter was calibrated in a manner which is described later in greater detail. This change in voltage across the 1 microfared capacitor causes the voltage at pin 9 of integrated circuit CD4046 to change thereby causing the frequency of the signal produced by the voltage controlled oscillator to change as well. The system will continue to adjust the voltage controlled oscillator frequency until the phase difference between the transmitted and the received signal no longer causes a change in voltage across the one microfared capacitor in the low-pass filter.

The ability to change operating frequency in response to gas composition change is critical to the ability of the present invention to operate where prior art systems cannot. It can be demonstrated that the transducers of the invention are able to produce maximum energy transfer from the transmitting to the receiving transducer when operated at an Eigen (characteristic) frequency which depends on the inner diameter of the transducer. Accordingly, when air is the gas in the transducer assembly when the meter is calibrated, the frequency of the voltage controlled oscillator corresponds to that which produces acoustic compressions having a fractional number of half wave lengths across the transducer diameter in air which corresponds to an Eigen frequency. If the gas density thereafter changes, the velocity of acoustic compressions therein also changes and hence a different phase difference is detected by the phase detector. This causes the frequency of acoustic compressions produced by the voltage controlled oscillator to change in a manner described in greater detail later and it can be demonstrated that the new frequency corresponds to one where the diameter of each transducer is again the Eigen value number of half wavelengths at the new frequency in the gas then in the transducer assembly. As such, maximum energy transfer between a transmitting and a receiving transducer is maintained.

The pulsewidth modulated signal appearing at the output of the phase detector comprises one of two inputs to an AND gate 140 whose output is coupled to an integrator circuit indicated generally at 142. The second input to the AND gate 140 is an integrate enable signal IE which is a logic one whenever either gate signal A or the gate siganl B is logic zero, a condition indicating that the phase detector output corresponds to the phase difference between a transmitted and a received signal. As such, the pulse width modulated signal is applied via the AND gate 140 when it is enabled by the integrate enable signal IE. The output of the integrator circuit 142 appears at pin 6 of the operational amplifier LM318 and comprises an integrated level during the integrate enable period whose final level is related to the phase difference between the transmitted signal at one transducer and the signal received at the other transducer and is coupled via a line 144 to input pin 5 of two different sample and hold circuits 146 and 148. Each sample and hold circuit 146 or 148 samples the voltage appearing at pin 5 when a gate signal is applied to each respective control input on gate pin 6. The sampled voltage appears at pin 11 and has the same level as appeared at pin 5 when the gate signal was present. The voltage at pin 11 of each sample and hold circuit 146 or 148 remains unchanged between gate pulses at pin 6. The sample and hold circuit 146 is gated to the sample mode whenever the signal appearing at input terminal U is logic one. In a similar manner, the sample and hold circuit 148 is gated to the sample mode whenever the input terminal D is logic one.

Between the sampling operations at either of the sample and hold circuits 146 and 148, an integrator reset signal appears at the input terminal IR and is operative to turn transistor Q12 on to short circuit a capacitor appearing between pin 6 and pin 2 of the operational amplifier within the integrator circuit 142. This resets the integrator so that its output voltage is zero.

In operation, the sample and hold circuits 146 and 148 are operative to store DC voltages which are representative of the phase difference between the transmitted signal at one transducer and the received signal at the other transducer. In the case of the sample and hold circuit 146 which is gated by the gate signal at input terminal U, a voltage is stored which, according to an arbitrary definition, corresponds to the phase difference between the signal transmitted by the downstream transducer 26 and the signal generated in response thereto at the upstream transducer 24, i.e., a so-called upstream phase difference. On the other hand, the sample and hold circuit 148 is operative in response to the gate signal D to store a voltage representing the phase difference between the signal transmitted by the upstream transducer 24 and the signal generated in response thereto by the downstream transducer 26, i.e., a so-called downstream phase difference.

The output from the sample and hold circuits 146 and 148 are respectively coupled to the inverting and the non-inverting input of an operational amplifier 150 which is configured to produce a voltage at its output pin 14 equal to the difference between the voltage applied at the non-inverting input terminal and the voltage appearing at the inverting terminal ($\phi_D - \phi_U$). As indicated earlier, this difference is representative of the uncorrected flow rate of a gas through the transducer assembly 10 (FIG. 1). In order to properly calibrate the flowmeter, the non-inverting input terminal of the operational amplifier has an offset adjustment network, indicated generally at 152, connected thereto which is operative to adjust the voltage at the non-inverting input terminal so that the voltage appearing at the output pin 14 is zero whenever the flow rate through the transducer assembly 10 is also zero. This offset adjust circuit 152 compensates for the various circuit offsets especially those for the sample and hold circuits 146 and 148.

The output of the sample and hold circuits 146 and 148 are each coupled via a 20K resistor to input pin 5 of a further sample and hold circuit 154. Since the outputs of sample and hold circuits 146 and 148 are coupled in the manner shown, the voltage at pin 5 of the sample and hold circuit 154 comprises one half of the sum of the two phase differences which are stored in the two sample and hold circuits 146 and 148. This sum is stored within the sample and hold circuit 154 in response to a summing signal received at the input terminal labelled 5. The output of the sample and hold circuit 154 is coupled by a further operational amplifier 156 which produces a DC voltage at output pin 8 and is related to the sum of the phase differences stored in the sample and hold circuits 146 and 148 at the time when the gate signal occurred. As indicated earlier, this voltage ($\phi_D + \phi_U$) at the output pin 8 of the amplifier 156 comprises a relative indication of the velocity of sound in the gas in the transducer assembly 10.

The voltage ($\phi_D + \phi_U$) appearing at pin 8 of amplifier 156 is fed back to a low pass filter comprising a 1 Meg ohm resistor and a one microfarad capacitor. The voltage across this one microfarad capacitor is coupled to pin 9 of circuit CD 4046 which connects internally to the VCO and thereby adjusts its frequency of operation. Accordingly, the voltage controlled oscillator frequency is changed as the velocity of sound in the gas in transducer 10 changes.

The circuitry of FIG. 4 and FIG. 5 in cooperation with the circuits of FIG. 2 is operative to produce a signal at output pin 14 of amplifier 150 which relates to the uncorrected flow through the transducer assembly 10 and a further output at pin 8 of amplifier 156 which is related to the velocity of sound in the gas in the transducer assembly 10. In accordance with the conventions established in defining transducer 24 as the upstream transducer and transducer 26 as the downstream transducer, whenever the voltage appearing at pin 14 of amplifier 150 is negative, this negative voltage indicates that fluid indeed is flowing through the transducer assembly in a direction from the upstream transducer 24 toward the downstream transducer 26. Additionally, the magnitude of the voltage appearing at pin 14 of amplifier 150 is related to and can be corrected by the circuitry of FIG. 6 to indicate the flow rate for the fluid passing through the assembly 10. On the other hand, if the voltage at pin 14 of amplifier 150 is positive, this indicates that fluid is flowing through the assembly 10 in a direction from the downstream transducer 26 toward the upstream transducer 24. Again, the magnitude of the voltage appearing at pin 14 of amplifier 150 corresponds to the uncorrected flow rate through the transducer assembly 10.

For the circuit shown in FIG. 5, however, the output of amplifier 156 is merely an indication related to the velocity of sound in the gas. In order to determine whether the velocity is greater or less than that for which the instrument was calibrated, one must record the amplitude at the time it is calibrated and then compare the current reading with that previously recorded value. The circuit, however, can be readily modified so that the output voltage is equal to zero whenever the calibrating fluid is present in the transducer assembly. Then, if the velocity of sound in the fluid subsequently changes, the output voltage either goes positive or negative and the sign of the voltage corresponds to whether the velocity has increased or decreased compared to the fluid for which the instrument was calibrated. The magnitude of the output voltage then corresponds to the relative difference between the sound velocity in the gas currently passing through the transducers and the sound velocity in the gas in the transducer assembly at the time it was calibrated. In order to use the output voltage to provide an indication of relative sound velocity more circuits are necessary since the output of amplifier 156 is dedicated for use as an error voltage to adjust the frequency of the voltage controlled oscillator VCO and as an input to the circuitry of FIG. 6.

A further alternative configuration permits the output voltage to be adjusted to equal one when, for example, air is present in the transducer assembly. Then, whenever the sound velocity of gas flowing through the transducer assembly changes, the magnitude of the output voltage corresponds to the velocity in the gas relative to the velocity in air.

The circuitry of FIG. 6 includes a circuitry for accepting the uncorrected flow rate from the output of amplifier 150 in FIG. 5 and producing a corrected flow rate output indication. It was found that the output of amplifier 150 had an error which is proportional to f1/f2 where f1 is the initial calibration frequency of the VCO in FIG. 5 and f2 is the frequency of the VCO when a gas having a different speed of sound is in the transducer. The circuitry of FIG. 6 multiplies the uncorrected flow rate output of amplifier 150 by f2/f1 to produce a corrected flow rate signal at pin 7 of amplifier LM324B in FIG. 6.

The VCO error voltage which appears at the output of amplifier 156 in FIG. 5 is proportional to frequency and is used to establish the correction factor for correcting the flow rate. The operational amplifier LM308 of FIG. 6 acts as a signal conditioner and receives the VCO error voltage ($\phi_D + \phi_U$). By adjustment of the zero adjust resistor coupled to the amplifier LM308, a zero volt output at pin 6 is established when the error voltage is at its nominal level (+7.5 volt). The signal conditioner provides an output voltage of ±1.0 volt per ∓5 KHz deviation.

The output at pin 6 of LM308 then modulates a duty cycle modulator consisting of amplifiers LM324A and LM311 and circuitry coupled thereto. When the VCO operates at the calibration frequency, the output of LM308 is zero, the duty cycle adjust resistor coupled to LM324A is adjusted to 50% whereat FET switches Q14 and Q15 are off 50% of the time and are on 50% of the time. As a result, the gain of amplifier LM324B is one and no correction is introduced to the uncorrected flow from amplifier 150 in FIG. 5 and the output at pin 7 of LM324B represents the flow rate of gas through the transducer.

When the VCO operating frequency changes, a voltage appears at pin 6 of LM308 in FIG. 6 which is positive for a decrease in frequency and negative for an increase in frequency. This voltage modulates the duty cycle generator causing the duty cycle to change. The duty cycle change causes the gain of amplifier LM324B to change in accordance with the change of VCO frequency so that the uncorrected flow rate signal from FIG. 5 is changed by LM324B so that the output is proportional to flow rate through the transducer.

The foregoing description of an acoustical wave flowmeter has been made with particular emphasis on a preferred electronic circuit which cooperates with a transducer assembly to provide not only gas flow and direction but also a measurement of relative sound velocity in the flowing gas. The description has made some emphasis on the fact that the invention is suitable as a flowmeter for measuring direction of flow, flow and sound velocity in a gas, however, the apparatus is equally operable for measuring direction of flow, flow and sound velocity in liquids as well although some circuit elements may require change in value to optimize performance of the flowmeter for applications other than gas flow direction, flow and sound velocity measurements. Furthermore, those of skill in the art will recognize other modifications to the flowmeter which might be made without departing from the spirit and scope of the invention as defined in the claims. For example, in place of the phase detector and the phase sum and difference calculators, the invention may utilize other equivalent means to calculate a representation proportional to or equal to the speed of acoustic compressions in the transducer traveling from the transmitting to the receiving transducer. Each calculated speed has two components, one being the speed of fluid flow and the other being the speed of acoustic compressions in the fluid without fluid flow. One such equivalent speed calculator may include means to determine the time difference between the start of acoustic compressions at a transmitting transducer and the time when the receiving transducer produces a received signal in response to the acoustic compression. Each time difference calculated is also proportional to the speed of acoustic compressions traveling from the transmitting to the receiving transducer.

Further benefits of the described flowmeter may be obtained by combining or rearranging the signals representing various parameters. For example, changes in gas composition which cause a change in molecular weight of the gas mixture also cause a change in the velocity of sound. Thus a transition from gas mixture A having an average molecular weight, $M_A$, to gas mixture mixture B having an average molecular weight, $M_B$, and the fraction of gas mixture A mixed with gas mixture B may be measured. Such a technique may be used with a gas flowmeter, for example to provide a proportional measurement of the fraction of carbon dioxide in the exhaled breath compared to that in the inhaled mixture.

Since the velocity of sound is given by:

$$c = \sqrt{\gamma kT/M} \text{ meters/second}$$

where
  $\gamma$ = ratio of specific heat at constant pressure to that at constant volume
  k = Boltzmans constant, $1.38 \times 10^{-23}$ joules/°C.
  T = absolute temperature, °Celsius
  M = mass of the molecules in the gas, kilograms,
it can be seen that molecular weight is proportional to $c^{-2}$ and for those skilled in the art, an electrical output can be produced which is proportional to changes in molecular weight; other variables remaining constant. It is apparent that this simple case can be extended to combine changes in specific heats and temperature with changes in molecular weight such that gas mixture A is typified by one set of conditions and gas mixture B by another set of conditions.

Additionally, where pressure or density is changing radically, the volumetric flow may be corrected to approximately standard conditions or true mass flow by combining a pressure measurement with parameters available from the described flowmeter. Mass flow is given by, $$\dot{M} = \dot{V} \, mp/kT \text{ kilograms/second}$$

where p = pressure, newtons/meter$^2$.

Thus from the equation for the velocity of sound, c, above $$\dot{M} = \dot{V} p \, \gamma/c^2$$

To those skilled in the art, it is apparent that a pressure transducer can be connected to measure the absolute pressure in the flowmeter. Further, the output signal of the pressure transducer multiplied by the volumetric flow, $\dot{V}$, from the flowmeter and divided by the square of the velocity of sound, c, also a signal from the flowmeter, along with appropriate constants, can provide an approximate value for true mass flow.

While a constant value for $\gamma$ will cause an error in value for some changes in gas mixture, there are many where the changes in $\gamma$ will be insignificant. The use of the above described parameters to produce a signal for volumetric flow reduced to standard temperature and pressure will also be apparent to those skilled in the art.

Having described a flowmeter system capable of accurately measuring flow rate independent of composition it is also apparent that the techniques may be applied with benefit to other sonic flowmeters wherein the transducers are not cylindrical or arcuate and thus may be in the flow path or cause some obstruction or recess along the flow path. That is, any sonic flowmeter may benefit from these techniques when errors are caused by changes in velocity of sound in the fluid.

Those of skill in the art will recognize that the acoustical flowmeter described above has achieved its principal objective, i.e., the flowmeter accuracy is relatively independent of changes in gas composition. Those of skill in the art will also recognize that the above and other changes can be made to the circuit described above to produce equivalent operation without departing from the spirit and scope of the invention as defined in the claims.

What is claimed is:

1. A meter for measuring the flow of a fluid along a path comprising, in combination:
    transducer means for transmitting acoustic compression waves upstream and downstream in a fluid flowing in said path;
    means for measuring the phase difference between two spaced points in the fluid flow path of the acoustic compression waves transmitted upstream and means for measuring the phase difference between two spaced points in the fluid flow path of the acoustic compression waves transmitted downstream;
    means for producing a difference signal dependent on the difference between the two phase differences, the magnitude and sign of which being directly related to the instantaneous fluid flow rate and its direction;
    means for automatically adjusting the frequency of the acoustic compression waves to a frequency where a fixed wavelength distance, in the fluid flow medium, occurs across the path of the transducer means, thereby maintaining operation at the acoustic resonance to maximize the magnitude of the received signal.

2. A meter for measuring the flow of a fluid along a path comprising, in combination:
    means defining a path for confining the fluid flow;
    a first and second transducer disposed along said path;
    a transducer control circuit coupled to said first and said second transducer to cause said first transducer to produce first acoustic compressions in the fluid and said second transducer to produce a first received signal when said first acoustic compressions are sensed thereby during a first transmit-receive cycle and to cause said second transducer to produce second acoustic compressions in the fluid and said first transducer to produce a second received signal when said second acoustic compressions are sensed thereby during a second transmit-receive cycle, said control circuit including means to switch from said first to said second transmit-receive cycle;
    first measurement means to measure a first phase difference comprising the phase difference between the first acoustic compression produced at said first transducer and said first received signal produced by said second transducer during each said first transmit-received cycle;
    second measurement means to measure a second phase difference comprising the phase difference between the second acoustic compression produced at said second transducer and said second received signal produced by said first transducer during each said second transmit-received cycle;
    difference means responsive to said first and said second measurement means to produce a difference whose magnitude equals the difference between one said first phase difference and one said second phase difference wherein the magnitude of said difference signal is directly related to the instantaneous fluid flow rate and the algebraic sign of said difference signal represents the direction of fluid flow along the path; and
    means coupled to said transducer control circuit to automatically adjust the frequency of the acoustic compressions produced by each said transducer to a frequency where a fixed wavelength distance, in the fluid flow medium, occurs across the distance of either said transducer, thereby maintaining operation at the acoustic resonance to maximize the magnitude of the received signal produced at the other transducer so that said difference signal output of the meter is insensitive to the velocity of sound in the fluid.

3. The meter of claim 2 wherein said first and said second transducer each comprise a transmitting and a separate receiving transducer.

4. The meter of claim 2 additionally including means to display the sum of said first phase difference and said second phase difference, the magnitude of the displayed sum being related to the velocity of sound in the fluid.

5. The meter of claim 2 wherein each said transducer comprises a cylindrical body with its inner surface substantially coextensive with the means defining said path so said transducers do not obstruct the fluid flow.

6. The meter of claim 5 wherein each said transducer comprises a crystal.

7. The meter of claim 6 wherein the crystal material comprises a material in the group comprising polyvinylflouridene, barium titanate, lead zirconate titanate, quartz, tourmaline, high polymer organic piezoelectric materials or polarized polycrystaline ferro electric ceramic materials.

8. The meter of claim 2 wherein said means to automatically adjust the frequency of acoustic compressions includes an oscillator for producing a signal at a frequency determined at least in part by the sum of said first phase difference and said second phase difference.

9. The meter of claim 2 wherein said transducer control circuit additionally includes means to continuously switch between said first transmit-receive cycle and said second transmit-receive cycle.

10. The meter of claim 2 additionally including means to store said first phase difference and said second phase difference.

11. The meter of claim 2 additionally including means responsive to said difference signal for correcting said difference signal into a correct flow rate signal.

12. The meter of claim 2 additionally including acoustic damping material disposed along said path at a position to substantially reduce acoustic compressions from either said transducer from leaving said means for defining a path and substantially reducing reflected acoustic compressions from entering said means for defining a path.

13. A meter for measuring the flow of a fluid along a path comprising, in combination:
- a tubular body defining a path for confining fluid flow;
- an adjustable oscillator for producing a signal at an adjustable frequency;
- a switching circuit to alternately switch said signal into an upstream signal and a downstream signal;
- a first transducer means and a second transducer means being disposed in spaced relation to each other along said tubular body, said first transducer means responsive to said upstream signal and said second transducer means responsive to said downstream signal, said first transducer means producing upstream acoustic compressions in the fluid responsive to said upstream signal and said second transducer means responds to said upstream acoustic compressions by producing an upstream received signal, said second transducer means producing downstream acoustic compressions in the fluid responsive to said downstream signal and said first transducer means responds to said downstream acoustic compressions by producing a downstream received signal;
- a phase detector responsive to each said upstream signal and to each said upstream received signal to produce an upstream phase difference which comprises the phase difference between said upstream signal and said upstream received signal, said phase detector also being responsive to each said downstream signal and to each said downstream received signal to produce a downstream phase difference which comprises the phase difference between said downstream signal and said downstream received signal;
- means to produce the sum of one said upstream phase difference and one said downstream phase difference; and
- means responsive to the sum of one said upstream phase difference and one said downstream phase difference to adjust the frequency of said adjustable oscillator to a frequency where a fixed wavelength distance occurs across the diameter of either said transducer when responding to a signal.

14. The meter of claim 13 additionally including:
- means to produce the difference between said upstream phase difference and said downstream phase difference; and
- means to display the difference between said upstream phase difference and said downstream phase difference, the algebraic sign of said difference indicating the direction of fluid flow in said tubular body and the magnitude of said phase difference being related to the speed of fluid flow.

15. The meter of claim 12 including means responsive to said frequency adjusting means and responsive to said difference producing means to produce a flow rate output signal indicating the flow rate of the fluid in said tubular body.

16. The meter of claim 13 wherein said first and said second transducer each comprise a cylindrical body with its inner cylindrical surface being coextensive with the inner surface of said tubular body.

17. The meter of claim 13 additionally including means to display the sum of said upstream phase difference and said downstream phase difference, the displayed sum being proportional to the speed of sound in the fluid.

18. The meter of claim 13 wherein said first and said second transducer each comprise a transmitting and a separate receiving transducer.

19. A flowmeter for measuring the flow rate of a fluid along a path comprising, in combination:
- means defining a substantially cylindrical path for confining fluid flow;
- a first and a second substantially cylindrical transducer disposed along said path, each said transducer having an inner diameter substantially identical to the diameter of said path;
- means operatively coupled to each said transducer to drive said first transducer to produce first acoustic compressions at an adjustable frequency in the fluid and produce first received signals at said second transducer in response to said first acoustic compressions during a first transmit-receive cycle and to drive said second transducer to produce second acoustic compressions at said adjustable frequency in the fluid and to produce second received signals at said first transducer in response to said second acoustic compressions during a second transmit-receive cycle;
- detector means to determine a first speed representation, during said first transmit-receive cycle, comprising the speed of acoustic compressions travelling from said first transducer to said second transducer and to determine a second speed representation, during said second transmit-receive cycle, comprising the speed of acoustic compressions travelling from said second transducer to said first transducer;
- means to sum said first and said second speed representation; and means responsive to said sum of said first and said second speed representation to adjust the frequency of the acoustic compressions produced by said first or said second transducer to the natural resonant frequency of the flow path cavity which causes a fixed wavelength distance to occur across the diameter of each said transducer.

20. The flowmeter of claim 19 wherein each said transducer is made of one material in the group comprising polyvinylflouridene, barium titanate, lead zirconate titanate, quartz, tourmaline, high polymer organic piezelectric materials or polarized polycrystaline ferro electric ceramic materials.

21. The flowmeter of claim 19 wherein said means coupled to each said transducer includes a voltage controlled oscillator, the frequency of said voltage controlled oscillator being controlled in part by said means responsive to said sum of said first and said second speed representation.

22. The flowmeter of claim 19 additionally including means to display the sum of said first and said second speed representation, the displayed sum being related to the speed of sound in the fluid in said path.

23. The flowmeter of claim 19 additionally including:
- means to calculate the difference between said first speed representation and said second speed representation; and
- means to correct said difference for changes in the velocity of sound in the fluid.

24. The flowmeter of claim 23 including means responsive to said corrected calculated difference and said frequency adjusting means to produce a signal representing the speed of sound in the fluid of said path.

25. The flowmeter of claim 19 wherein said frequency is maintained at a frequency such that said inner diameter is substantially equal to 2.3λ where λ is the wavelength of sound produced by said transducers in the fluid within said path.

26. A meter for measuring the flow of a fluid along a path comprising, in combination:
means defining a substantially cylindrical path for confining fluid flow;
a first and a second substantially cylindrical transducer disposed along said path, each said transducer having an inner diameter substantially identical to the diameter of said path;
means to alternately produce a signal representing a first transmit-receive cycle and a signal representing a second transmit-receive cycle;
means operatively coupled to each said transducer to drive a signal to said first transducer to produce first acoustic compressions in the fluid and to receive first received signals from said second transducer produced thereby in response to said first acoustic compressions during said first transmit-receive cycle and to drive a signal to said second transducer to produce second acoustic compressions in the fluid and to receive second received signals from said first transducer produced thereby in response to said second acoustic compressions during said second transmit-receive cycle;
means responsive to each said first transducer drive signal and each said first received signal to produce a first proportional representation of the velocity of acoustic compressions travelling from said first to said second transducer and responsive to each said second transducer drive signal and each said second received signal to produce a second proportional representation of the velocity of acoustic compressions travelling from said second to said first transducer, where each said proportional representation of velocity is a function of the speed of acoustic compressions in the fluid as well as the direction and speed of fluid flow along said path;
means for producing a signal indicating the instantaneous velocity of sound in the fluid flowing along the path corresponding to the sum of said first and second proportional representations;
means, responsive to said signal indicating the instantaneous velocity of sound in the fluid flowing along the path, to control the frequency of acoustic compression produced by both the transducers so that a fixed preselected wavelength distance, in the fluid flow medium, occurs across both said transducers, thereby maintaining operation at the acoustic resonance to maximize the magnitude of the received signals.

27. The meter of claim 26 additionally including means to display the velocity of sound in the fluid.

28. The meter of claim 26 additionally including means to produce the difference between said first and said second proportional representation wherein the sign of said difference corresponds to the direction of flow along said path and the magnitude is related to the velocity of fluid flow.

29. The meter of claim 26, wherein each transducer is made of a material in the group comprising polyvinylflouridene, barium titanate, lead zirconate titanate, quartz, tourmaline, high polymer organic piezoelectric materials or polarized polycrystaline ferro electric ceramic materials.

30. The flowmeter of claim 26 wherein said means coupled to each said transducer includes a voltage controlled oscillator which is coupled to said first and said second transducers respectively during said first and said second transmit-receive cycle for producing said acoustic compression.

* * * * *